UNITED STATES PATENT OFFICE.

MARY ELISABETH BLANDINA ERLINGER, OF BELLEVILLE, ILLINOIS.

COMPOSITION OF MATTER TO BE USED IN PAINTING.

1,356,913.  Specification of Letters Patent.  Patented Oct. 26, 1920.

No Drawing.  Application filed July 31, 1919. Serial No. 314,486.

*To all whom it may concern:*

Be it known that I, MARY ELISABETH BLANDINA ERLINGER, a citizen of the United States, and resident of Belleville, Illinois, have invented certain new and useful Improvements in Composition of Matter to be Used in Painting, of which the following is a specification containing a full, clear, and exact description.

The object of my invention is to produce a composition of matter that can be used as one of the coats in the application of succeeding coats of pigments to a surface and, particularly as one of the coats described as coat two in my patent application filed in the United States Patent Office this 31 day of July, 1919, Serial No. 314487.

A further object is to produce a composition of matter, when used as indicated in said application, that will aid in producing a surface that will not crack or craze, and one that can be obtained by the use of a minimum number of coats and, hence with little labor or at small expense.

My composition consists of the following ingredients used in substantially the following proportions by volume:

| | |
|---|---|
| Manders filler | 2 parts |
| White lead | 2 parts |
| Rubbing varnish | 1 part |
| Japan | 1 part |

Manders filler consists of the following ingredients mixed in the following proportions and manner:

Silver whitening two pounds, and dry white lead one pound. These are thoroughly mixed dry and then one pint of linseed oil is added and the whole thoroughly mixed. To this mixture is added one pint of turpentine, one-half pint of japan and two pounds of yellow ocher, and two tablespoons of lampblack. While these ingredients are being added, the entire mixture is agitated to make a homogeneous mixture.

Silver whitening consists of calcium carbonate 94.79%, silicon dioxid 3.03% and water 2.18% by weight. To which may be added a sufficient amount of coloring matter to give or retain the desired color.

My composition is applied in the conventional manner by means of a brush, jet, etc.

What I claim and mean to secure by Letters Patent is—

A composition of matter composed of two parts Manders filler, two parts white lead, one part rubbing varnish and one part japan, all proportions taken by volume.

In testimony whereof I have signed my name to this specification, in presence of two subscribing witnesses.

MARY ELISABETH BLANDINA ERLINGER.

Witnesses:
PHYLLIS S. MOFFRAY,
FERDINAND C. BRETSNYDE.